United States Patent Office 3,558,688
Patented Jan. 26, 1971

3,558,688
PREPARATION OF ALLYLIC NITRILES FROM ALLYLIC ESTERS AND HCN IN THE PRESENCE OF ZERO-VALENT NICKEL CATALYSTS
William C. Drinkard, Jr., Kynlyn, Wilmington, Del., assignor to E. I. du Pont de Nemours and Company, Wilmington, Del., a corporation of Delaware
No Drawing. Filed Oct. 26, 1967, Ser. No. 678,185
Int. Cl. C07c *121/30*
U.S. Cl. 260—465.9                               12 Claims

ABSTRACT OF THE DISCLOSURE

Claimed is the novel process for the preparation of allylic nitriles, e.g., allyl cyanide, from HCN and an allylic ester, e.g., allyl acetate, in the presence of a zero-valent nickel catalyst, e.g., $Ni[P(OC_6H_5)_3]_4$, and, optionally, an aprotonic Lewis acid, e.g., $ZnCl_2$.

FIELD OF THE INVENTION

The invention relates to the catalyzed process of preparing allylic nitriles by the reaction of allylic esters with hydrogen cyanide.

PRIOR ART

No references have been found which disclose the formation of a nitrile from a carboxylic ester, saturated or unsaturated, by reaction with hydrogen cyanide. The closest known art shows formation of allyl cyanide from hydrogen cyanide and allyl chloride (allyl ester of an inorganic acid) in the presence of a supported copper salt catalyst (Roberts and Lynn, British Pat. 841,468). Otherwise in related prior art unsaturated carboxylic esters are shown to react with hydrogen cyanide at the double bond to form adducts in which the ester grouping is unaffected ([a] Migridichian, The Chemistry of Organic Cyanogen Compounds, ACS Monograph No. 105, pp. 220–222; [b] Ellingboe, U.S. Pat. 2,397,341).

SUMMARY OF THE INVENTION

The present invention can be defined broadly as the process of preparing allylic nitriles by the reaction of allylic esters of carboxylic acids with hydrogen cyanide in the presence of a zero-valent nickel catalyst, optionally with an added aprotonic Lewis acid.

DETAILED DESCRIPTION OF THE INVENTION

The reaction involved in the process is the displacement of an alkylcarbonyloxy group by a cyano group and can be represented as follows:

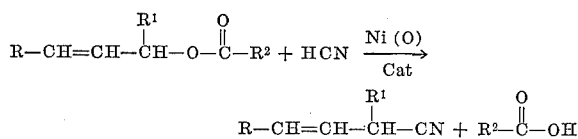

R, $R^1$, and $R^2$, in the above formulas represent hydrogen or lower alkyl groups. The preferred reactants are those in which R and $R^1$ are hydrogen or methyl, and $R^2$ is lower alkyl.

The active nickel catalysts, catalytic amounts of which are requisite in the process, are nickel compounds of the general formula $Ni(PXYZ)_4$ wherein X is $OR^3$ and Y and Z are selected from the class consisting of $OR^3$ and $R^3$ wherein $R^3$ is selected from the class consisting of alkyl and aryl groups having up to 18 carbon atoms. If desired, any of X, Y and Z may be conjoined. Examples of divalent conjoined Y and Z are tetramethylene, pentamethylene, and ethylenedioxy groups. The ethylenedioxy group is an example of divalent conjoined X and Y or Z. It is believed that in these nickel compounds (complexes) at least some of the nickel is present in the zero-valent state. The preferred catalysts are the zero-valent nickel complexes in which the neutral ligands P(XYZ) are the aryl phosphites, such as triphenyl phosphite, tris(p-chlorophenyl) phosphite, tris(p-methoxyphenyl) phosphite, and tris(p-cresyl) phosphite. Under some of the reaction conditions of the present invention, one or more of the ligands may become dissociated from the nickel. In this specification, however, specific mention of one of the $Ni(PXYZ)_4$ compounds as a catalyst refers to the compound added to the reaction mixture.

The zero-valent nickel catalyst preferably is prepared prior to use. Methods of preparing the catalysts are disclosed in U.S. Pats. 3,152,158 and 3,328,443. However, catalyst can also be prepared in situ by placing in the reaction mixture an alkyl or aryl phosphite together with an intermediate zero-valent nickel compound or an intermediate organonickel compound having a nickel-carbon bond. The amount of phosphite ester relative to the nickel compound is preferably the amount equivalent to that in the corresponding tetrakis(phosphite) nickel(O) complex or an excess of that amount. It is not entirely certain what unseparated reaction products are formed in the reaction mixture by the in situ preparation process, although zero-valent nickel is believed always to be present. Consequently, the catalyst formed in such in situ preparations will be referred to as a "reaction product."

The intermediate zero-valent nickel compounds which form active catalysts in situ on addition of an alkyl or aryl phosphite can themselves be prepared in situ prior to addition of the phosphite ester. Such nickel compounds, which include those containing carbon monoxide, phosphines, arsines, stibenes, arsenites, stibites, acrylonitrile, and mixtures thereof, can be represented by the formula

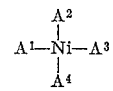

wherein $A^1$, $A^2$, $A^3$, and $R^4$ are neutral ligands, which may be the same or different, and represent carbon monoxide, acrylonitrile, and $M(X'Y'Z')$ wherein M is P, As, and Sb, and $X'$, $Y'$, and $Z'$ are the same or different and are defined as a member of the class consisting of $R^4$, $NR_2^4$, Cl, and F, and wherein $R^4$ is a member of the class consisting of alkyl and aryl groups having up to 18 carbon atoms. When acrylonitrile is a neutral ligand, the values of $A^1$, $A^2$, $A^3$, and $A^4$ in the above formula are satisfied by two molecules of acrylonitrile alone (one molecule being represented by a pair of the A's) or by two molecules of acrylonitrile and two $M(X'Y'Z')$ entities (one molecule of acrylonitrile being represented by one of the A's).

There are several techniques for in situ preparation of the intermediate zero-valent nickel compounds. For example, nickel carbonyl and a neutral ligand as defined above (other than carbon monoxide) can be added to the reaction mixture. It is preferred to wait until carbon monoxide evolution ceases before using the compound. Generally, at least two moles and preferably all four moles of CO are replaced by another ligand such as triphenyl phosphite. A second technique involves adding the neutral ligand (as defined above), a nickel (II) compound such as a nickel halide, e.g., $NiCl_2$, $Ni(CN)_2$, or Ni-bis-acetylacetonate and source of hydride ($H^-$) ions. Suitable sources of $H^-$ ions are compounds of the structure $M'[BH_4]_n$, $M'[AlH_4]_n$, $H_2$, and $M'H_n$ where $M'$ is an alkali metal or an alkaline earth metal and $n$ is a number corresponding to the valence of the metal. A third technique is to add dicyclopentadienylnickel and a neutral ligand such as $M(OR)_4$ where M is As, P, or Sb and R is aryl, to the reaction mixture. In each case, the compound is formed under the displacement reaction conditions described above and no other special temperatures or pressures need be observed.

In many instances, it is advantageous to have an excess of certain neutral ligands present with respect to the nickel in the catalyst. The preferred excess ligands are the aryl phosphites wherein the aryl groups contain up to 18 carbon atoms. Generally, the excess ligand is present in at least a two molar excess as based on the nickel present. The only limit of excess ligand involves practical considerations for it may even be used as the solvent. However, generally there is little advantage to be obtained in using over a 300 mole excess of ligand as based on one mole of nickel, since the rate of the displacement reaction becomes too slow to be practical due to the decreased concentration of nickel present. This use of excess ligand may be used to extend catalyst life. The excess ligand used may be the same or different from the ligand attached to nickel in the intermediate nickel compound.

The intermediate zero-valent nickel compounds and also the zero-valent nickel catalysts and catalytic reaction products prepared in situ are characterized by having neutral ligands which are thought to be bonded to the central metal atom by both sigma- and pi-type bonds. This type of bonding is described, for example, in Cotton and Wilkinson (Advanced Inorganic Chemistry, Interscience Publishers, 1962, pp. 602–606).

In the present process, aprotonic Lewis acid, or more simply, Lewis acid modifiers are beneficial as promoters with the zero-valent nickel catalysts. Such Lewis acids include salts of metals, such as zinc chloride, aluminum chloride, titanium chloride and stannous chloride and organo-metallic compounds, such as triphenylboron,

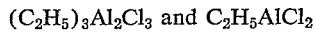

Zinc chloride and stannous chloride are here preferred Lewis acid modifiers. Lewis acids are discussed in detail, for example, in U.S. Pats. 3,062,836 and 3,062,837, and the pertinent discussions of these patents are specifically incorporated herein by reference.

The Lewis acid promoter usually employed in this invention is the salt of a metal. The salt should be at least partially soluble in the system and should not tend to oxidize anything in the system. The anion portion of the salt is preferably selected from the class consisting of halide, i.e., fluoride, chloride, bromide, and iodide; anions of lower fatty acids of from 2 to 7 carbon atoms, $HPO_3^{-2}$, $H_2PO_2^-$, $CF_3COO^-$, $OSO_2C_7H_{15}^-$, and $SO_4^{-2}$. The amount of promoter used generally is varied from about 1:16 to 50:1 molar ratio of promoter to catalyst. The promoter may be used according to several techniques. Thus, while at least some of the promoter may be added to the reaction mixture at the start of the reaction, additional amounts may be added at a point in time during the reaction before the activity of the catalyst has diminished in effectiveness. The promoter may, furthermore, be used with either preformed zero-valent nickel catalysts or the zero-valent reaction products formed in situ.

The displacement reaction which constitutes the process aspect of this invention may be carried out by charging a reactor with all of the reactants; or preferably it may be accomplished by charging the reactor with the catalyst or catalyst components, the allylic ester, the Lewis acid promoter, and whatever solvent is to be used, and then sweeping hydrogen cyanide gas over the surface of the reaction mixture or bubbling it through the reaction mixture. The hydrogen cyanide may conveniently be mixed with an inert gas, e.g., nitrogen, as it is swept over or through the reaction mixture. In a batchwise operation, the reaction mixture is preferably agitated, as by stirring or shaking. Alternatively, the process can be conducted in a continuous operation, as when using a fixed bed of catalyst and feeding over or through the fixed bed the allylic ester as a vapor along with the gaseous hydrogen cyanide and any inert gas. The allylic cyanide product can be recovered by conventional techniques such as distillation.

The reactor can be constructed of glass, stainless steel, Hastelloy®, or other inert material.

The reaction can be carried out with or without a solvent, which should be liquid at the reaction temperature and pressure and inert toward the components of the reaction mixture and the catalyst. Generally such solvents are aliphatic or aromatic hydrocarbons (hexane, cyclohexane, benzene, xylene), nitriles (acetonitrile, benzonitrile), ethers (diethyl ether, tetrahydrofuran, dioxane, ethylene glycol dimethyl ether, anisole), and phosphite esters. Aryl phosphites (triphenyl phosphite, tricresyl phosphite) are especially satisfactory and preferred as solvents. However, the reaction is usually carried out "neat," i.e., without an added solvent.

The molar ratio of allylic ester to catalyst is generally in the range of about 5:1 to 1000:1 for a batch operation and preferably in the range of about 100:1 to 200:1. In a continuous operation with a fixed bed catalyst, a higher proportion of catalyst is used, such as about a 1:2 ratio of allylic ester to catalyst.

The reaction can be carried out at temperatures in the range 0–200° C., the preferred range being about 60–120° C. Atmospheric pressure is satisfactory and preferred for the process because of simplicity. However, pressures above or below atmospheric pressure can be used if desired.

The time of reaction is not critical and generally depends on other variables as well as on convenience. It can vary from a few seconds in continuous flow operation to many hours in static systems. The products are believed to be insensitive to prolonged exposure to the catalyst.

SPECIFIC EMBODIMENTS OF THE INVENTION

There follow some examples which are intended to illustrate, but not to limit, the process of the invention.

EXAMPLE 1

Preparation of allyl cyanide

A 50-ml. glass reactor was equipped with a thermometer, a reflux condenser provided at the exit with two bubbler traps in series to block entrance of air from outside, and a gas inlet tube attached to a source of nitrogen via an intermediate bubbler tube. The reactor was charged under a nitrogen purge with 20 g. of allyl acetate, 2.0 g. of $Ni[P(OC_6H_5)_3]_4$, and 0.22 g. of zinc chloride, and the inlet bubbler tube was partly filled with liquid HCN. The contents of the reactor were heated to 80° C. and then HCN was introduced by means of a flow of nitrogen ($N_2$ sweep) through the inlet tube. A total of 6 ml. of liquid HCN was added over a period of one hour. The reaction mixture was analyzed by gas chromatography, which indicated the presence of 21.5 area percent of allyl cyanide (gas chromatographic data expressed in area percent are approximations of weight percent—see Purnell, "Gas Chromatography," John Wiley & Sons, 1962, page 285).

EXAMPLES 2–9

The table which follows presents data for the preparation of allyl cyanide and crotyl cyanide (3-pentenenitrile) from HCN with allyl acetate and crotyl acetate, respectively, using various combinations of zero-valent nickel catalysts and Lewis acid promoters by the procedures described in Example 1.

TABLE

| Example | Catalyst (g.) | Activator (g.) | Allyl compound | Product, percent in crude |
|---|---|---|---|---|
| 2 | Ni[P(OC₆H₅)₃]₄ (2) | None | Allyl acetate | 14.8, allyl cyanide. |
| 3 | Ni[P(OEt)₃]₄ (1.2) | ZnCl₂ (0.22) | do | 23.1, allyl cyanide. |
| 4 | Ni[P(OC₆H₅)₃]₄ (2) | SnCl₂ (1.1) | do | 24.4, allyl cyanide. |
| 5 | Ni[P(OC₆H₅)₃]₄ (2) | ZnCl₂ (0.22) | Crotyl acetate | 7,3-pentenenitrile. |
| 6 | Ni[P(OC₆H₅)₃]₄ (2) | SnCl₂ (1.1) | do | 1.5,3-pentenenitrile. |
| 7* | Ni[P(OC₆H₅)₃]₄ (2) | ZnCl₂ (0.22) | Allyl acetate | 57.5, allyl cyanide. |
| 8* | Ni[P(OC₆H₅)₃]₄ (2) | SnCl₂ (1.1) | do | 62.7, allyl cyanide. |
| 9* | Ni[P(OC₆H₅)₃]₄ (2) | ZnCl₂ (0.22) | Crotyl acetate | 1.9,3-pentenenitrile. |

*Contained 11 g. of P(OC₆H₅)₃.

The allylic nitrile products of the process of this invention are known compounds useful as intermediates for the production of the corresponding dinitiriles via hydrocyanation. The dinitriles, of course, are among the well-known intermediates for the manufacture of polyamides.

I claim:
1. The process of producing a nitrile of the formula

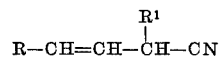

in which R and R¹ are selected from the group hydrogen and methyl,
which comprises contacting HCN at a temperature in the range of 0–200° C. with an ester of the formula

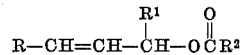

in which R and R¹ have the above meaning and R² is selected from the group hydrogen and lower alkyl,
in the presence of a zero-valent nickel catalyst of the general formula Ni(PXYZ)₄, in which X is OR³, and Y and Z are selected from the group OR³ and R³; R³ being an alkyl or hydrocarbyl aryl of up to 18 carbon atoms, or phenyl bearing no more than two substituents from the group methyl, methoxy, and chlorine;
it being further provided that any two of X, Y, and Z can be jointed to form a lower alkylene or the ethylenedioxy group.

2. The process of claim 1 in which the catalyst is prepared in situ by a reaction of an aykyl or aryl phosphite of the formula P(OR³)₃, in which R³ has the same meaning as in claim 1, with an intermediate nickel compound of the formula

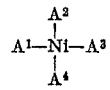

wherein A¹, A², A³, and A⁴ are the same or different neutral ligands of the group consisting of
  (a) carbon monoxide;
  (b) P(X'Y'Z'), wherein X', Y', and Z' are the same or different and are members of the group consisting of R⁴, NR₂⁴, Cl and F; R⁴ being a lower alkyl or hydrocarbyl aryl up to 18 carbon atoms;
  (c) acrylonitrile, two molecules of acrylonitrile satisfying either all of the A's or only two of the A's, in the latter case the other two A's being satisfied by P(X'Y'Z').

3. The process of claim 2 whereing, additionally, an aprotonic Lewis acid is used as a promoter.

4. The process of claim 2 wherein allyl cyanide is prepared from HCN and allyl acetate.

5. The process of claim 4 wherein the catalyst is Ni[P(OC₆H₅)₃]₄.

6. The process of claim 5 wherein, additionally, zinc chloride is used as a promoter.

7. The process of claim 5 wherein, additionally, stannous chloride is used as a promoter.

8. The process of claim 4 wherein the catalyst is Ni[P(OEt)₃]₄.

9. The process of claim 2 wherein 3-pentenenitrile is prepared from HCN and crotyl acetate.

10. The process of claim 9 wherein the catalyst is Ni[P(O₆H₅)₃]₄.

11. The process of claim 10 wherein, additionally, zinc chloride is used as a promoter.

12. The process of claim 10 wherein, additionally, stannous chloride is used as a promoter.

References Cited

UNITED STATES PATENTS 2,328,890  9/1943  Clifford et al. ____ 260—465.9X

JOSEPH P. BRUST, Primary Examiner

U.S. Cl. X.R.

260—465.2

PO-1050
(5/69)

UNITED STATES PATENT OFFICE
CERTIFICATE OF CORRECTION

Patent No. 3,558,688   Dated January 26, 1971

Inventor(s)   William C. Drinkard, Jr.

It is certified that error appears in the above-identified patent and that said Letters Patent are hereby corrected as shown below:

Col. 5, Claim 1, line 43, "jointed" should be -- joined

Signed and sealed this 25th day of July 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,558,688     Dated January 26, 1971

Inventor(s) William C. Drinkard, Jr.

It is certified that error appears in the above-identified patent and that said Letters Patent are hereby corrected as shown below:

Col. 5, Claim 1, line 43, "jointed" should be -- joined --

Col. 6, Claim 1, line 40, "$Ni[P(O_6H_5)_3]_4$" should be -- $Ni[P(OC_6H_5)_3]_4$ --.

Signed and sealed this 21st day of November 1972.

(SEAL)
Attest:

EDWARD M. FLETCHER, JR.
Attesting Officer

ROBERT GOTTSCHALK
Commissioner of Patents